J. J. GREFENSTETTE.
VEHICLE TIRE.
APPLICATION FILED OCT. 31, 1911.

1,046,774.

Patented Dec. 10, 1912.

Witnesses
Edward P. Rea
Juana M. Fallin

Inventor
J. J. Grefenstette
By A. Macey, Attorney

UNITED STATES PATENT OFFICE.

JOHN J. GREFENSTETTE, OF PITTSBURGH, PENNSYLVANIA.

VEHICLE-TIRE.

1,046,774.   Specification of Letters Patent.   Patented Dec. 10, 1912.

Application filed October 31, 1911. Serial No. 657,756.

*To all whom it may concern:*

Be it known that I, JOHN J. GREFENSTETTE, citizen of the United States, residing at Pittsburgh, in the county of Allegheny and State of Pennsylvania, have invented certain new and useful Improvements in Vehicle-Tires, of which the following is a specification.

This invention relates to cushion tires for vehicles, and more particularly to that class of such tires which include, as the cushioning means, a solid rubber body, and the primary aim of the invention is to provide such a tire so constructed that the body will not be liable to become worn down or otherwise mutilated.

The invention contemplates the provision of a tire of this class including, in its structure, a body of yieldable material, such as rubber, and a non-yieldable section, circumferentially embracing the said body, and one feature of the invention resides in the novel means employed in holding the non-yieldable section in place upon the cushion section. Relative lateral displacement of the cushion and non-yieldable sections is provided against by forming the cushioning section or body with a circumferentially extending rib formed in the inner surface of the non-yieldable section, which latter section constitutes the tread of the tire. Creeping of the non-yieldable tread section about the yieldable body section is prevented by bolts having their shanks threaded into the said tread section, and having their heads seating in recesses in the yieldable body section, and the invention further contemplates inserting in each of these recesses a filling plug of the same material as the body section so that the body section will not be weakened at the recesses and the heads of the bolts will be in effect embedded in the said body section.

For a full understanding of the invention reference is to be had to the following description and accompanying drawing, in which:—

Figure 1:
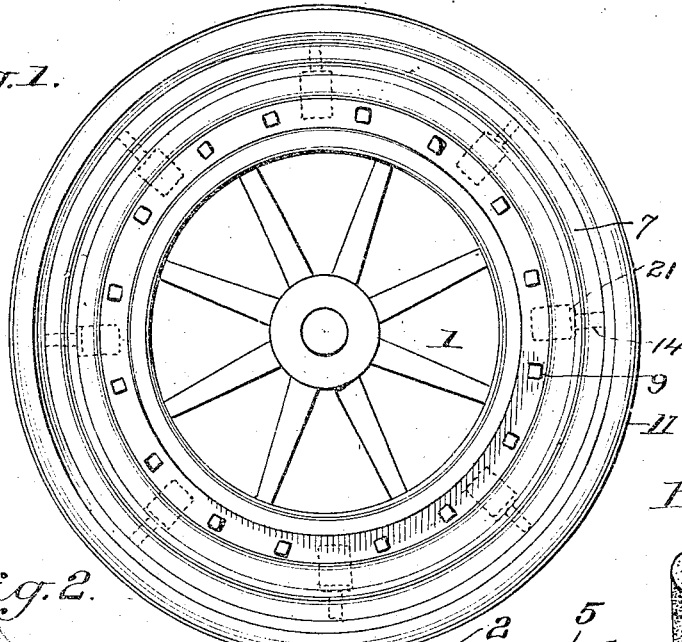
Figure 2:
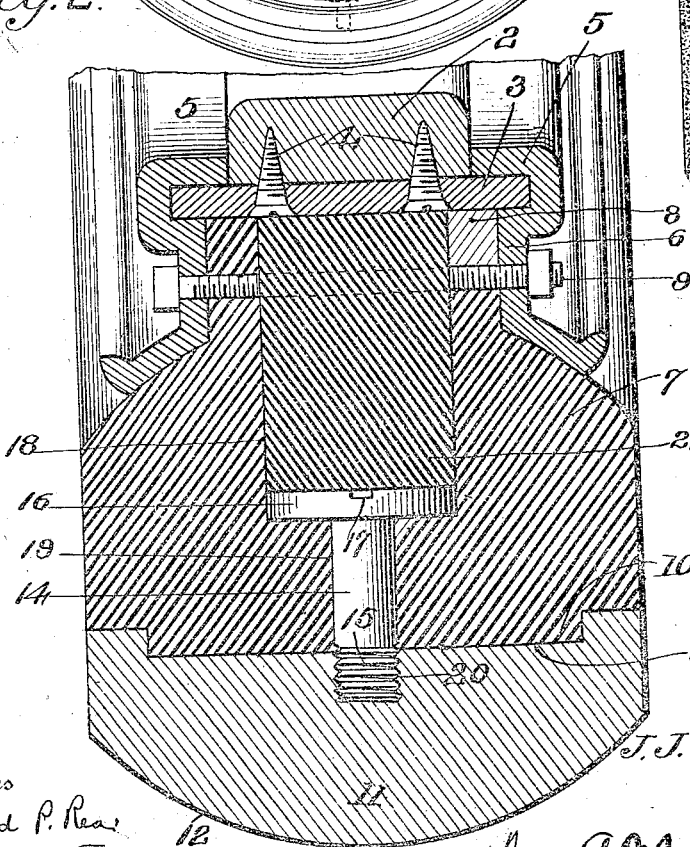
Figure 3:
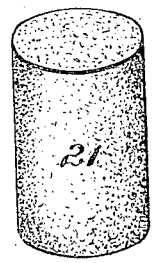

Figure 1 is a view in side elevation of a tire constructed in accordance with the present invention applied to a vehicle wheel. Fig. 2 is a transverse sectional view in detail through the tire. Fig. 3 is a perspective view of one of the filling plugs.

Corresponding and like parts are referred to in the following description and indicated in all the views of the accompanying drawing by the same reference characters.

The tire embodying the present invention may be employed in any ordinary vehicle wheel having a rim constructed to hold an ordinary solid rubber cushion tire, and the wheel illustrated in Fig. 1 is indicated in general by the numeral 1, and includes a felly 2 which is usually of wood, and a band 3 which circumferentially embraces the felly and is secured thereto by means of screws 4. The band 3 projects laterally beyond each side of the felly 2 in the manner shown in Fig. 2 of the drawing, and fitted over the projecting edge portions of the said band are the rabbeted inner portions 5 of the rim-sections 6 between which is clamped the yieldable body section of the tire embodying the present invention. In the drawing the cushion body of the tire is indicated by the numeral 7 and is preferably of solid rubber, it being narrowed as at 8, and fitted between the rim sections 6 in the manner shown in Fig. 2 and being held in this position by means of a number of bolts 9 passed through the said rim sections and through the body section 7. The body section 7 is formed with a relatively wide circumferentially extending rib 10, the purpose of which will be presently explained.

The thread section of the tire is indicated by the numeral 11 and preferably has a transversely convex tread surface 12, and is formed of some non-yieldable material, preferably aluminum iron or steel. The inner side of this tread section 11 is formed with an annular channel 13 receiving the rib 10 of the body section 7, in the manner shown in Fig. 2 of the drawing. It will be observed that the lateral sides of the tread section 11 are flush with the corresponding sides of the body section 7. It will be readily understood that the engagement of the rib 10 in the channel 13 serves to prevent lateral displacement of the tread section 11 with respect to the body section 7. In order to prevent creeping of the tread section about the body section, there are provided a number of bolts 14 having their shanks threaded at one end as at 15 and provided at their opposite ends with heads 16 which are circular and are formed each with a groove 17 for the engagement of a large screw driver or similar tool. The body section 7 is formed at intervals with recesses 18 extending radially therein and the body section is further formed with openings 19, each axially alined and in communication with one of the recesses 18. The tread section 11 is formed in the bottom wall of its channel 13 with threaded sockets 20 and in connecting the sections 7 and 11 by means of the bolts 14, the said bolts are inserted in the recesses 18 and their shanks are inserted through the openings 19 and are threaded in the sockets 20 in the said tread section. When properly threaded into the sockets 20, the bolts will have their heads 16 bearing against the bottom walls of the recesses 18. In order that the body section 7 of the tire will not be weakened at the recesses 18, a cylindrical filling plug 21 is fitted in each recess 18 and rests at its inner end against the bolt heads 16 at the bottom of this recess and at its outer ends against the outer side of the band 3. These plugs 21 are of the same material as the body section 7 of the tire and the bolt heads 16 are therefore, in effect, embedded in the said body section of the tire.

From the foregoing description of the invention it will be readily understood that there is provided a vehicle tire which is particularly well adapted for use on the wheels of heavy motor-driven vehicles. It will further be understood that the non-yieldable tread 15, effectually protects the yieldable body 7 of the tire so that the latter will not become worn and mutilated, as do the treads of solid rubber tires now in use. Furthermore, the tire is not weakened at the points of engagement of the bolts 14 through its body section 7, due to the provision of the filling plugs or cores 21.

Having thus described the invention what is claimed as new is:—

In a vehicle tire, a yieldable body section formed with radially extending recesses in its inner face and with bolt receiving openings, a non-yieldable tread section having sockets in its inner side circumferentially embracing the body section with the sockets registering with the bolt receiving openings of the body section, securing bolts extended outwardly through the bolt openings of the body and threaded by their outer ends in the sockets of the tread, the heads of said bolts being seated in the outer ends of the recesses, and yieldable filling plugs fitted in said recesses and bearing against the bolt heads to support the bolts against inward pressure.

In witness whereof I affix my signature in presence of two witnesses.

JOHN J. GREFENSTETTE. [L. s.]

Witnesses:
KARL J. GREFENSTETTE,
GEORGE A. FREKER.